Sept. 8, 1931. H. W. PORTER 1,822,745
CUTTING TOOL
Filed Nov. 18, 1930
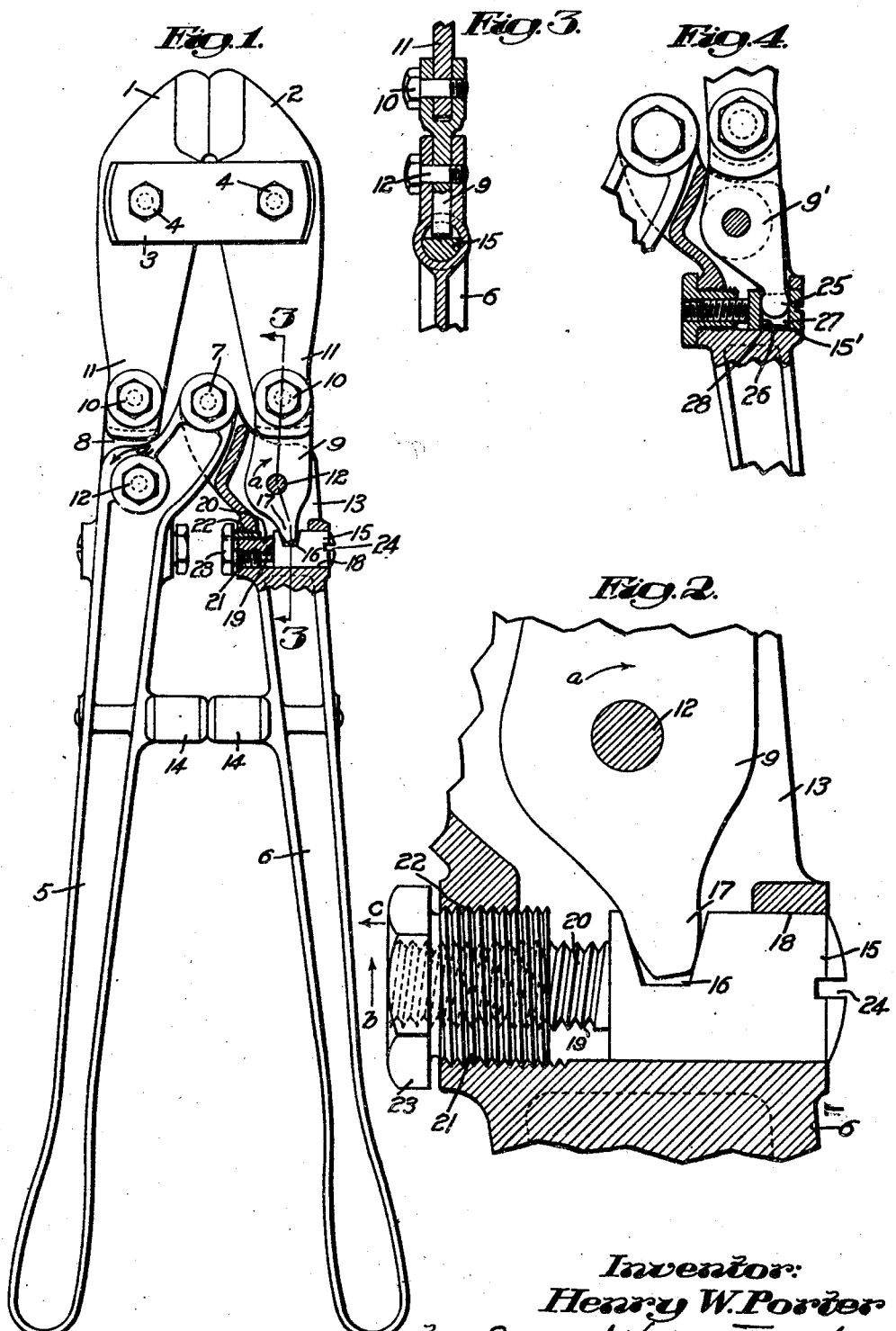
Inventor:
Henry W. Porter Patented Sept. 8, 1931

1,822,745

UNITED STATES PATENT OFFICE

HENRY W. PORTER, OF BROOKLINE, MASSACHUSETTS, ASSIGNOR TO H. K. PORTER, INC., A CORPORATION OF MASSACHUSETTS

CUTTING TOOL

Application filed November 18, 1930. Serial No. 496,460.

This invention aims to provide quick setting powerful adjusting means for the cutting jaws of bolt or like cutting tools.

In the accompanying drawings, wherein I have shown merely for illustrative purposes certain embodiments of my invention, Figure 1 is a side elevation, partly in section, of a cutting tool embodying this invention;

Fig. 2 is a much enlarged detail section of the adjusting section of the tool;

Fig. 3 is a detail transverse section taken on line 3—3 of Fig. 1; and

Fig. 4 is a detail view of a modified form of adjusting section.

The particular embodiment of the invention selected for purposes of illustration and shown in the drawings comprises cutting jaws 1 and 2 pivoted together by straps 3 and screws 4. Cooperation between said cutting jaws 1 and 2 is effected herein by means of handle levers 5 and 6, which levers are in turn pivotally connected together near their forward ends by a stud 7.

The cutting jaws 1 and 2 are further operatively connected together and to the handle levers 5 and 6 by means of adjusting sections 8 and 9, each of which sections, for example the section 9 (see Figs. 1 and 3), is pivotally connected by a stud 10 with the tail 11 of its respective cutting jaw. Each of said adjusting sections is furthermore pivotally connected at 12 intermediate of its length in a recess 13 formed in the outer edge of each handle lever.

As is common with cutting tools of the type herein disclosed, adjusting sections are provided to be adjusted relatively to each other and to the handle members to separate the connecting pivots 10 so as to bring the cutting edges of the cutting jaws 1 and 2 closer together when said jaws are in closed relation in order to compensate for wear due to regrinding or otherwise.

Desirably the pivots 10, 10 of said cutting jaws and the pivot 7 of said handle levers 11 are arranged with their axes in substantial horizontal alignment as viewed from Fig. 1 and constitute a toggle whereby the cutting edges of said cutting jaws may be maintained substantially in contact when said pivots are in such alignment, while the swinging outwardly of said handle members 5 and 6 about the pivot 7 breaks said toggle by throwing said pivots out of alignment and resulting in the opening of the cutting jaws. It is desirable, however, that the cutting edges of said cutting jaws be maintained in parallel contact, as shown in Fig. 1, when the handle levers 5 and 6 are together, and the stops 14 of said handle levers are in abutting relation. Therefore to maintain said cutting jaws in such relation, that is in parallel contact, the adjusting sections 8 and 9, hereinbefore referred to, are provided, and the above result will be obtained by rocking said adjusting sections about the pivots 12 (see Figs. 1 and 2) in the direction of the arrows $a$.

The rocking of said adjusting sections may obviously be performed in numerous ways, but it is desirable that the movements of said adjusting sections be accomplished quickly and by powerful means, and to this end I have provided differential adjusting devices, herein consisting of a reciprocatory member 15 desirably of cylindrical form and arranged to reciprocate transversely of its handle lever 6 for example. The cylindrical member 15 is transversely recessed at 16, said recess being herein formed to receive and fit an oppositely rounded end portion 17 formed upon the adjusting sections 8 and 9. In other words, as shown most clearly in Fig. 2, this member 17 is substantially the shape of a single gear tooth, and the recess 16 is substantially similar to a space formed in a conventional rack designed to receive and operate the tooth 17 without lost motion.

The member 15 is arranged to reciprocate in a cylindrical recess 18 formed transversely in the handle lever with said recess 16 in proper engagement with the tooth 17, and by reason of this relation and by the fact that said tooth 17 is arranged substantially to fit said recess, the member 15 is prevented from rotating in the recess 18 during reciprocatory movement of said member 15. The inner end of the member 15 is substantially reduced in diameter to form a stem portion 19, and upon this stem is formed a series of screw threads 20, as hereinafter more fully described.

Also arranged within the hollow portions 13 of each of the handles 5 and 6, and adjacent to the pivoted ends, thereof, see Fig. 2, is a rotary sleeve-like member 21 which is externally threaded at 22 to engage corresponding screw threads within fixed parts, herein the parts 5 and 6 of the tool. Each sleeve 21 is also internally threaded axially, the threads whereof are arranged to engage the screw threads 20 of the stem 19.

The ends of the sleeves 21 which are directed inwardly of said handle levers protrude slightly from said handle levers and are provided at their protruding ends with polygonal heads 23 to which a wrench may be fitted to effect the turning of said sleeves, and the screw threads 20 and 22 are desirably of different and opposite pitch, whereupon the rotation of each sleeve 21 relatively to the handle lever within which it is mounted will produce a differential movement between said sleeve and said reciprocatory member 15 to produce a differential movement whereby quick adjustment of the adjusting section 9 or 8 will be effected.

Desirably the screw thread 22 is a single thread and of relatively low pitch, while the thread 20 formed upon the stem 19 is desirably at least a double thread and of coarse and opposite pitch, whereupon a slight rotation of the polygonal end 23 of said sleeve, for example in the direction of the arrow $b$ (Fig. 2), will cause the sleeve to move in the direction of the arrow $c$ in said figure. In view of the fact that the screw thread 20 is relatively coarser than the thread 22 and of much steeper and opposite pitch, for example in a ratio of two to one, one complete rotation of said sleeve will effect a movement thereof in the direction of the arrow $c$ the equivalent of the lead of said screw thread 22, while the reciprocatory member 15 will be moved in the direction of said arrow $c$ a distance equal to the lead of the screw thread 20 plus the lead of said screw thread 22. It will consequently be seen that a very slight movement or rotation of said sleeve will effect a relatively greater movement or adjustment of said tooth shaped end 17, and the radius of the circular pitch of said tooth from the axis of the pivot 12 being less than the distance of the axis of said pivot 12 from the axis of the pivot 10, the movement of said last named axis will be still greater than the movement of a point in the pitch circle of said tooth 17, thereby effecting a quick and powerful adjustment of the pivotal connections between said cutting jaws and handle levers.

It will be observed that the member 15 protrudes slightly from the right hand end of the recess 18 (see Fig. 2), and this protruding end is slotted at 24 for permitting a screw driver end or similar tool to be inserted therein and effect the turning of said member 15 during the assembling of the sleeve and said member 15, the tooth 17 serving to prevent rotation of said member 15 after assembling has been completed. It will also be apparent that by providing the single relatively fine screw threads upon the parts 21 engaging a relatively fixed part of a handle lever and the coarse double threads of opposite pitch internally engaging threads formed within said member 21, a compound adjustment for the adjusting section will result, and this adjustment will be effected by only a slight rotation of the sleeve 21 which produces a relatively greater movement of the part 15. This permits the heads 23 to be turned toward the inner edges of the handles and being capable with said slight turning movement to effect a much greater movement of the part 15. Furthermore the said adjusting sections are so arranged that the turning of the part 23 in opposite directions will effect adjustment of the cutting edges toward or from each other thereby eliminating the necessity of using two separate adjusting screws, one for effecting the movement of one cutting jaw away from the other and another for effecting the movement of said cutting jaw toward the other. In other words the adjusting sleeve 23 constitutes a two-way adjustment by turning said sleeve in opposite directions.

In Fig. 4 I have shown a modified form of my invention in which the adjusting section 9' has a rounded end 25 in place of the gear tooth shaped end 17 of the form shown in Fig. 2. Opposite sides of said rounded end 25 are arranged to engage opposite surfaces 26 and 27 in a slot 28 which is formed vertically of the cylindrical portion 15'. The part 15' may be reciprocated by differential means substantially as shown in Fig. 2 comprising the sleeve 21 and stem 19 although the invention is not limited thereto.

The invention is not limited to the specific embodiment shown.

Claims

1. A cutting tool comprising, in combination, cooperating cutting jaws, cooperating handle levers therefor, adjusting sections one for each cutting jaw fulcrumed to said handle levers, one end of each of said adjusting sections terminating in a depending arm lying within the side edges of said lever arm and means within said handle lever arm for engaging and adjusting said arm, said means including cooperating cam surfaces, said handle lever arm affording a bearing for said adjusting means opposite the fulcrumed point of said adjusting sections tending to resist downward action upon said adjusting sections caused by said cooperating cam surfaces, said adjusting sections being bifurcated at the ends to embrace said cutting jaw ends and provide rigid support for said adjusting sections and cutting jaws.

2. A cutting tool comprising, in combination, cooperating cutting jaws, cooperating handle levers therefor, adjusting sections for said cutting jaws fulcrumed to said handle levers, said adjusting sections each having an end terminating in a tooth-shaped arm forming cam surfaces, a rack member slidable in said handle lever and having cam surfaces cooperating with the cam surfaces of said tooth-shaped arm, said rack member being slidable in said handle lever and having a bearing surface opposite said tooth-shaped arm in all positions of adjustment thereof to resist lateral and downward action upon said rack member produced by said cooperating cam surfaces, and means for adjusting said rack member.

3. A cutting tool comprising, in combination, cooperating cutting jaws, cooperating handle levers therefor, adjusting sections for said cutting jaws fulcrumed to said handle levers, said adjusting sections having an end terminating in a tooth-shaped arm, a rack member receiving said tooth-shaped arm and slidable in said lever arm, said rack member having differential adjusting means comprising a threaded stud and a threaded nut of different pitch mounted in said handle lever and engaging the threaded stud whereby rotation of said nut effects operation of the adjusting section.

4. A cutting tool comprising, in combination, cooperating cutting jaws, cooperating handle levers therefor, adjusting sections for said cutting jaws fulcrumed to said handle levers, each adjusting section having an end terminating in a depending tail, an operating member slidable in said lever arm and having a recess therein extending substantially midway its thickness for receiving said tail to provide a substantial engagement therebetween, and means for adjusting said operating member.

5. A cutting tool comprising, in combination, cooperating cutting jaws, cooperating handle levers therefor, adjusting sections for said cutting jaws fulcrumed to said handle levers, each adjusting section having an end terminating in a depending tail provided with a tooth section, an operating member slidable in said handle lever arm and provided with a rack toothed recess of a depth substantially equal to the working depth of the tooth section, and means for adjusting said operating member.

6. A cutting tool comprising, in combination, cooperating cutting jaws, cooperating handle levers therefor, adjusting sections for said cutting jaws fulcrumed to said handle levers and having an opposite arm formed with a tooth section conforming to a standard tooth section of equal diametral pitch, an operating member mounted in said handle lever and formed with a recess in one side thereof to receive said tooth section and of a depth equal at least to the working depth of the tooth section, and means for adjusting said operating member.

7. A cutting tool comprising, in combination, cooperating cutting jaws, cooperating handle levers therefor, adjusting sections for said cutting jaws fulcrumed to said handle levers, and having an opposite arm formed with a tooth section conforming to a standard tooth section of equal diametral pitch, an operating member mounted in said handle lever and formed with a recess in one side thereof to receive said tooth section and provide a full gear tooth bearing therewith, and means for adjusting said operating member.

8. A cutting tool comprising, in combination, cooperating cutting jaws, cooperating handle levers therefor, adjusting sections for said cutting jaws fulcrumed to said handle levers, each adjusting section having an end terminating in a gear tooth shaped arm, a rack member receiving said gear tooth shaped arm and slidable in said lever arm, differential adjusting means including a threaded stud carried by said rack, a threaded nut engaging said stud and having a portion externally threaded with threads of finer pitch and engaging corresponding threads of said handle lever, and means to rotate said nut to effect adjustment of said adjusting section.

In testimony whereof, I have signed my name to this specification.

HENRY W. PORTER.